US008968896B1

United States Patent
(12) United States Patent
Hager

(10) Patent No.: US 8,968,896 B1
(45) Date of Patent: Mar. 3, 2015

(54) MITIGATION OF INTERNAL SHORTING FOR IMPROVED BATTERY SAFETY

(71) Applicant: The Boeing Company, Chicago, IL (US)

(72) Inventor: Harold E. Hager, Bellevue, WA (US)

(73) Assignee: The Boeing Company, Chicago, IL (US)

(*) Notice: Subject to any disclaimer, the term of this patent is extended or adjusted under 35 U.S.C. 154(b) by 26 days.

(21) Appl. No.: 13/958,438

(22) Filed: Aug. 2, 2013

(51) Int. Cl.

| | |
|---|---|
| ***H01M 10/44*** | (2006.01) |
| ***H01M 2/38*** | (2006.01) |
| ***H01M 2/22*** | (2006.01) |
| ***H01M 10/42*** | (2006.01) |
| ***H01M 10/0525*** | (2010.01) |

(52) U.S. Cl.
CPC ...... *H01M 10/4235* (2013.01); *H01M 10/0525* (2013.01)
USPC ...................... 429/50; 429/67; 429/61; 429/8

(58) Field of Classification Search
CPC ...................... H01M 10/4235; H01M 10/0525
USPC ........................................... 429/50, 8, 61, 67
See application file for complete search history.

(56) References Cited

PUBLICATIONS

"Safety Issues for Lithium-Ion Batteries", Underwriters Lab (UL), downloaded on Feb. 28, 2013, from http://www.ul.com/global/documents/newscience/whitepapers/firesafety/FS_Safety%20Issues%20for%20Lithium-Ion%20Batteries_10-12.pdf.

*Primary Examiner* — Helen O Conley
(74) *Attorney, Agent, or Firm* — Vista IP Law Group LLP; Cynthia A. Dixon

(57) ABSTRACT

The present disclosure teaches a method, system, and apparatus for the mitigation of internal shorting for improved battery safety. In one or more embodiments, the disclosed method for mitigating internal shorting in a battery involves sensing, with at least one sensor, an internal shorting condition of the battery. The method further involves producing, by at least one processor, at least one commanding signal to initiate motion of a filament breaking mesh. Also, the method involves moving, by at least one drive mechanism, the filament breaking mesh, upon receiving at least one commanding signal. Further, the method involves breaking, with the filament breaking mesh, at least one filament present within the battery.

25 Claims, 4 Drawing Sheets

100
180
170
190
160
Positive Electrode
130
150
Negative Electrode
140
110
120

200
180
170
190
160
120
Positive Electrode
130
150
Negative Electrode
140
110

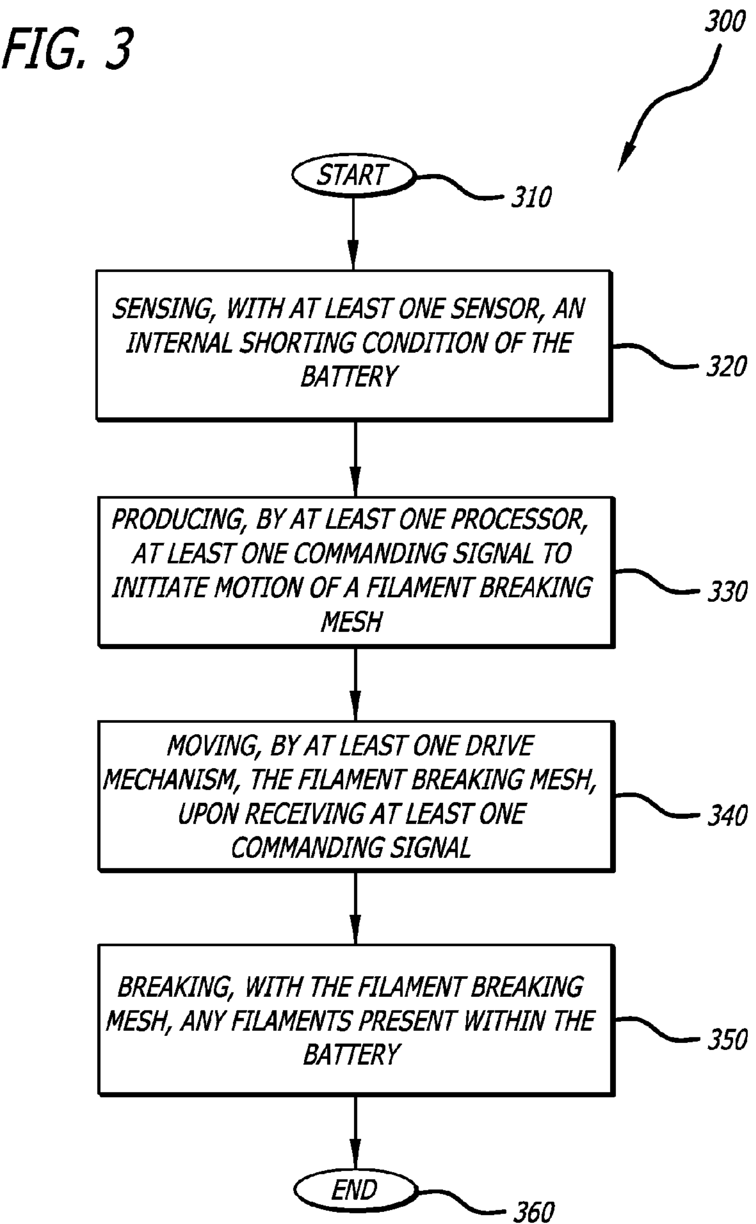
FIG. 3
300
START
310
SENSING, WITH AT LEAST ONE SENSOR, AN INTERNAL SHORTING CONDITION OF THE BATTERY
320
PRODUCING, BY AT LEAST ONE PROCESSOR, AT LEAST ONE COMMANDING SIGNAL TO INITIATE MOTION OF A FILAMENT BREAKING MESH
330
MOVING, BY AT LEAST ONE DRIVE MECHANISM, THE FILAMENT BREAKING MESH, UPON RECEIVING AT LEAST ONE COMMANDING SIGNAL
340
BREAKING, WITH THE FILAMENT BREAKING MESH, ANY FILAMENTS PRESENT WITHIN THE BATTERY
350
END
360

620
600
610
640
630
110
110
650

MITIGATION OF INTERNAL SHORTING FOR IMPROVED BATTERY SAFETY

FIELD

The present disclosure relates to improved battery safety. In particular, it relates to mitigation of internal shorting for improved battery safety.

BACKGROUND

Internal shorts within very high power density batteries (e.g., lithium-ion batteries) represent a continuing issue. These internal shorts can produce rising temperatures and pressures in the battery cells in which they occur. Unfortunately, isolating the battery from external circuit connections does not eliminate the electrochemical current produced by internal shorts within the battery cells and, hence, external circuit protection is not sufficient to eliminate this problem. Therefore, an approach to reduce the presence of internal shorts and, thereby, mitigate the problems arising from electrochemical reactions driven by these internal shorting conditions is needed.

SUMMARY

The present disclosure relates to a method, system, and apparatus for mitigation of internal shorting for improved battery safety. The disclosed method for mitigating internal shorting in a battery involves sensing, with at least one sensor, an internal shorting condition of the battery. The method further involves producing, by at least one processor, at least one commanding signal to initiate motion of a filament breaking mesh. Also, the method involves moving, by at least one drive mechanism, the filament breaking mesh, upon receiving at least one commanding signal. Further, the method involves breaking, with the filament breaking mesh, at least one filament present within the battery.

In one or more embodiments, the sensing of at least one sensor comprises sensing temperature, sensing voltage, sensing impedance, and/or sensing pressure. In at least one embodiment, the battery is a lithium-ion battery. In some embodiments, at least one drive mechanism is a shuttle driver attached to the filament breaking mesh.

In at least one embodiment, the filament breaking mesh is manufactured from at least one polymeric material. In some embodiments, at least one polymeric material is a polymer. In one or more embodiments, the polymer is a polyacrylonitrile or a polyamide. In at least one embodiment, at least one polymeric material is a copolymer. In some embodiments, the copolymer is a polyamide-imide or a fluorinated ethylene propylene.

In some embodiments, a diameter of mesh fibers of the filament breaking mesh are manufactured to be approximately four times an expected largest diameter of any of the filaments within the battery. In at least one embodiment, a grid size of the filament breaking mesh is 5 millimeters (mm) or less. In some embodiments, the filament breaking mesh is manufactured from a material that is non-conductive and unreactive with materials of the battery.

In one or more embodiments, the breaking with the filament breaking mesh involves breaking at least one of the filaments and/or involves pulling at least one of the filaments off at least one electrode of the battery.

In one or more embodiments, a system for mitigating internal shorting in a battery comprises at least one sensor to sense an internal shorting condition of the battery. The system further comprises a filament breaking mesh within the battery to break at least one filament present within the battery. In addition, the system comprises at least one processor to produce at least one commanding signal to initiate motion of the filament breaking mesh, when an internal shorting condition is sensed by the at least one sensor. Further, the system comprises at least one drive mechanism to move the filament breaking mesh, upon receipt of at least one commanding signal, to break at least one of the filaments present within the battery.

In at least one embodiment, at least one sensor is a temperature sensor, a voltage sensor, an impedance sensor, and/or a pressure sensor. In some embodiments, the filament breaking mesh is configured to break at least one filament within the battery by breaking at least one of the filaments and/or by pulling at least one of the filaments off at least one electrode of the battery. In one or more embodiments, the battery comprises a positive electrode and a negative electrode that are separated by a separator. In at least one embodiment, the separator is manufactured from at least one material to provide ionic conduction for current flow between the positive electrode and the negative electrode. In some embodiments, the filament breaking mesh lies adjacent and parallel to the separator within the battery.

In one or more embodiments, an apparatus for mitigating internal shorting in a battery comprises a filament breaking mesh within the battery to break at least one filament present within the battery. The apparatus further comprises at least one drive mechanism to move the filament breaking mesh, when an internal shorting condition of the battery occurs, to break at least one of the filaments present within the battery.

The features, functions, and advantages can be achieved independently in various embodiments of the present embodiments or may be combined in yet other embodiments.

DRAWINGS

These and other features, aspects, and advantages of the present disclosure will become better understood with regard to the following description, appended claims, and accompanying drawings where:

FIG. 3 is a flow diagram for the disclosed method for mitigation of internal shorting for improved battery safety, in accordance with at least one embodiment of the present disclosure.

DESCRIPTION

Figure 1:
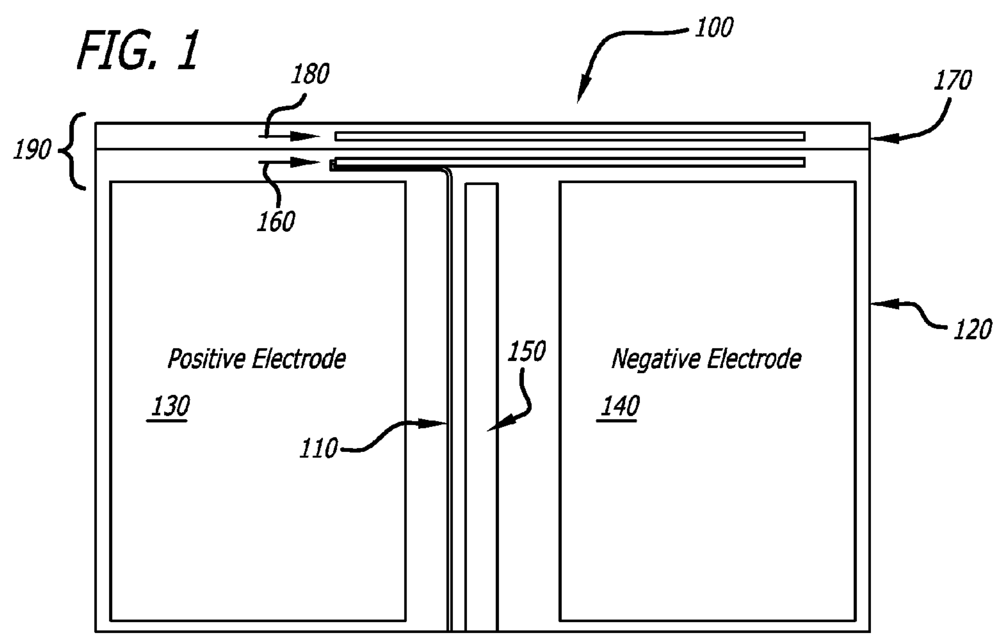
FIG. 1 is a schematic diagram of the disclosed system for mitigation of internal shorting for improved battery safety showing the initial position of the filament breaking mesh, in accordance with at least one embodiment of the present disclosure.

The methods and apparatus disclosed herein provide an operative system to provide a new capability for implementing a higher level of protection within the battery cells of high power density batteries (e.g., lithium-ion batteries). In particular, this system employs a filament breaking mesh within the battery to provide a means to physically break the metal filaments (e.g., metallic dendrite growths growing from the surface of the electrode(s)) that are producing internal shorts within the battery cell. Specifically, the filament breaking mesh is activated to break the metal filaments based on automated sensed indication of an internal cell shorting condition (e.g., thermal and/or pressure excursion thresholds are exceeded) or on other diagnostics indicating the threat of this condition (e.g., results from a voltage and/or an impedance measurement). It should be noted that the term "breaking" is used here to describe either physically breaking the metal filaments or pulling the metal filaments off of one of the electrodes, in both cases to break the electrical contact that the metal filaments are providing between the electrodes (i.e. to break the internal shorting path).

As previously mentioned above, internal shorts within very high power density batteries (e.g., lithium-ion batteries) represent a continuing issue. These internal shorts can produce rising temperatures and pressures in the battery cells in which they occur. Unfortunately, isolating the battery from external circuit connections does not eliminate the electrochemical current produced by internal shorts within the battery cells and, hence, external circuit protection is not sufficient to eliminate this problem. The present disclosure provides an approach to reduce the presence of internal shorts and, thereby, mitigate the safety problems arising from electrochemical reactions driven by these internal shorting conditions.

It was well recognized during the development of very high power density batteries (e.g., lithium-ion batteries) that external and internal shorts present a problem. Cell separators were developed to physically isolate the positive and negative electrodes of the battery cell, thereby reducing the problem associated with shorting between the electrodes (i.e. internal shorting). It should be noted that these separators provide ionic conduction for current flow between the electrodes. In more sophisticated designs, the separator is constructed from a temperature sensitive porous material. Under normal cell conditions, the open pores allow for charge transport through the electrolyte in the pores. But, when the cell temperature gets high (e.g., as the temperature does during external shorting conditions), the material of the separator melts, thereby closing the pores and, thus, halting the ionic current flow through the separator. However, during internal shorting conditions, these temperature sensitive separators cannot fully mitigate the internal short because: (1) the internal short is generated by metal filaments that grow out from the electrodes and through the separator, thereby ultimately producing electric conduction paths between the electrodes, (2) the high current densities within the filaments providing the electrode to electrode contact produce electrolyte heating and pressurization that keeps the surrounding pores of the separator from closing; while these filaments may become so hot that they burn up, their initial current transport has produced large pores in the separator that allows for continued ionic current flow, even under thermal conditions that close the "as produced" separator pores, and (3) as some filaments burn out, an increasing number grow and connect between the electrodes; as the cell temperature continues to rise as a consequence of the electrochemical reactions driven by these internal shorts and as the electrochemical kinetics are made more favorable with the high temperatures, this positive feedback can lead to yet higher and higher cell temperatures and pressures.

The present disclosure uses a filament breaking mesh that will be commanded to break the shorting filaments that have grown between the electrodes. In one embodiment, the filament breaking mesh is located adjacent to the separator (e.g., on the positive side of the separator or, alternatively, on the negative side of the separator). Upon indication of the formation of metal filaments or internal shorts, the filament breaking mesh will be pulled (i.e. moved) parallel to the separator to transversely pull on the filaments, thereby applying sufficient force to break the filaments. In one or more embodiments, there are two general requirements for the filament breaking mesh. The first general requirement for the filament breaking mesh is that the material used to manufacture the filament breaking mesh must be compatible with the chemistry of the cell, including the requirement that it will not provide unwanted reaction pathways for any of the cell components. Types of materials that may be used to manufacture the filament breaking mesh include, but are not limited to, a range of various polymeric materials. The second general requirement for the filament breaking mesh is that the filament breaking mesh must employ fibers that are sufficiently strong to break the metal filaments. For the case of lithium metal, as in lithium-ion batteries, this is not a difficult requirement to meet because lithium is a very soft metal with a low Young's modulus. For example, this requirement for lithium metal can be readily met by simply employing polymer mesh fibers having diameters that are four times the diameter of the largest expected metal filament.

The control signal for commanding the filament breaking mesh to physically break the metal filaments can be based on a range of selected cell conditions. For example, the selected cell conditions may include, but are not limited to, cell temperature, cell pressure, cell voltage and/or cell impedance. For example, in one embodiment, the system would comprise at least one thermal sensor and a fiber breaking mesh that will be commanded to move if a defined temperature threshold is exceeded. In another embodiment, a cell pressure sensor could be employed. For this embodiment, the fiber breaking mesh will be commanded to move if a defined pressure threshold is exceeded. In yet another embodiment, a sensor to monitor the cell voltage and/or the cell impedance (possibly in conjunction with the thermal sensing and/or the pressure sensing) could be employed. For this embodiment, the activation of the fiber breaking mesh motion could be determined by a cell health algorithm utilizing the sensed cell voltage and/or impedance data.

Similarly, there is a variety of different options for implementing the mechanical system needed to drive the motion of the filament breaking mesh. One possible approach is to deploy a magnet with a protective coating encapsulated in a shuttle piece within the cell, and to connect one end of this shuttle piece to the lower end (or, alternatively, the upper end) of the filament breaking mesh. Outside of the sealed cell and below the bottom of the cell (or, alternatively, above the top of the cell), will be a complementary spring-loaded magnetic shuttle driver. A switch controlled latch can be used to release the spring-loaded magnetic shuttle driver, which will magnetically induce the upper shuttle motion (or, alternatively, the lower shuttle motion) of the shuttle within the cell. Alternatively, the shuttle driver can be set up as an electromagnetic driver, thereby inducing the shuttle attached to the fiber breaking mesh to move by providing the electromagnetically induced motion of the internal shuttle.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 is a schematic diagram 100 of the disclosed system for mitigation of internal shorting for improved battery safety showing the initial position of the filament breaking mesh 110, in accordance with at least one embodiment of the present disclosure. In this figure, a battery cell 120 is shown to include a positive electrode 130 and a negative electrode 140. The positive electrode 130 and the negative electrode 140 are separated by a separator 150. The separator 150 is manufactured from a material(s) that will provide for ionic conduction for current flow between the positive electrode 130 and the negative electrode 140.

Also in this figure, a filament breaking mesh 110 is shown. The filament breaking mesh 110 is shown to be located adjacent to the separator 150. For this embodiment, the filament breaking mesh 110 is shown to be positioned on the positive side of the separator 150. However, it should be noted that for other embodiments, the filament breaking mesh 110 may be positioned on the negative side of the separator 150.

For this embodiment, at least one sensor (not shown) is used to sense different states of the battery cell 120 that aid in determining whether an internal shorting condition exists within the battery cell 120. Various different types of sensors that may be employed by the disclosed system 100 include, but not limited to, a temperature sensor, a pressure sensor, a voltage sensor, and an impedance sensor. At least one processor (not shown) uses the sensor data to determine whether an internal shorting condition exists within the battery cell 120. For example, the processor(s) may determine that an internal shorting condition exists because the sensor data indicates that a predefined temperature threshold and/or pressure threshold has been exceeded. Once the processor(s) determines that an internal shorting condition is present within the battery cell 120, the processor(s) will send at least one commanding signal to a drive mechanism 190 to initiate motion of the filament breaking mesh 110, which will cause the metal filaments causing the internal shorting condition to break.

The drive mechanism 190 that moves the filament breaking mesh 110 will now be described in detail. The top of the filament breaking mesh 110 is shown to be connected to a shuttle piece 160, which is housed within the battery cell 120. The shuttle piece 160, in at least one embodiment, comprises a magnet with a protective coating that is encapsulated within the shuttle piece 160. Outside of the battery cell 120, is an external shuttle driver compartment 170. The external shuttle driver compartment 170 comprises an external shuttle driver 180. The external shuttle driver 180 comprises a complementary spring-loaded magnet (i.e. the magnet in the external shuttle driver 180 is complementary to the magnet in the shuttle piece 160). In one or more embodiments, a switch-controlled latch (not shown) can be used to release the external shuttle driver 180, which will magnetically induce the shuttle piece 160 to move. When the shuttle piece 160 moves, the filament breaking mesh 110 will be pulled along with the shuttle piece 160. It should be noted that in alternative embodiments, the external shuttle driver 180 can be set up as an electromagnetic driver, thereby inducing the shuttle piece 160 to move by providing the electromagnetically induced motion.

Figure 2:
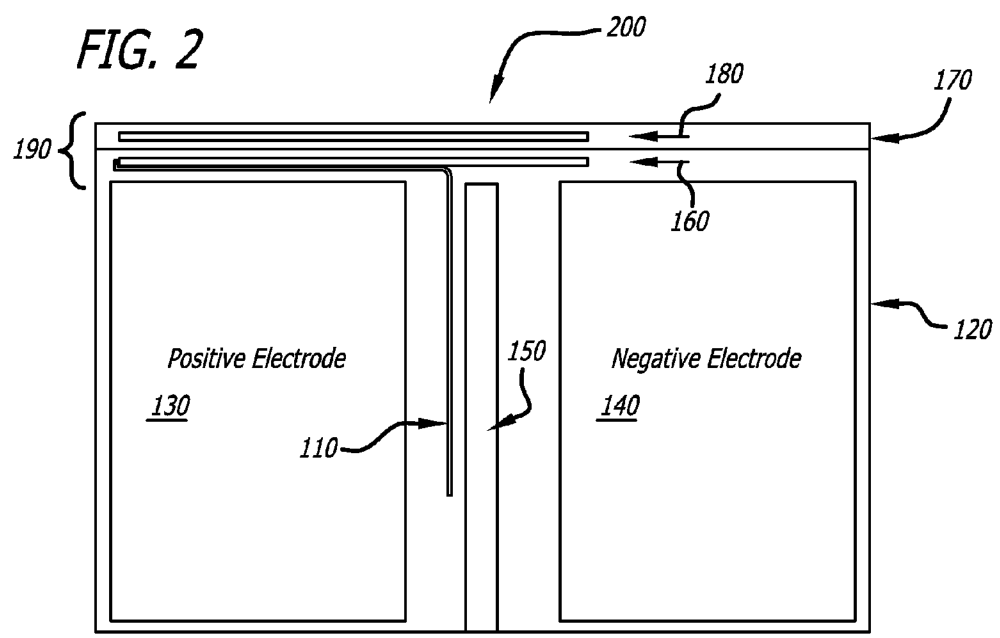
FIG. 2 is a schematic diagram of the disclosed system for mitigation of internal shorting for improved battery safety showing movement of the filament breaking mesh away from the initial position of FIG. 1, in accordance with at least one embodiment of the present disclosure.

FIG. 2 is a schematic diagram 200 of the disclosed system for mitigation of internal shorting for improved battery safety showing movement of the filament breaking mesh 110 away from the initial position of FIG. 1, in accordance with at least one embodiment of the present disclosure. In this figure, the external shuttle driver 180 is shown to have moved away from its position in FIG. 1. When the external shuttle driver 180 moved, the external shuttle driver 180 magnetically induces the shuttle piece 160 to move along with the external shuttle driver 180. Also, since the shuttle piece 160 is attached to the filament breaking mesh, when the shuttle piece 160 moved, the shuttle piece 160 pulled the filament breaking mesh 110 along with the shuttle piece 160. During internal shorting conditions when metal filaments are present within the battery cell 120, when the filament breaking mesh 110 moves within the battery cell 120, the filament breaking mesh 110 breaks the metal filaments, thereby removing the shorting conditions with the battery cell 110.

FIG. 3 is a flow diagram illustrating a disclosed method 300 for mitigation of internal shorting for improved battery safety, in accordance with at least one embodiment of the present disclosure. At the start 310 of the method 300, at least one sensor senses an internal shorting condition of the battery 320. Then, at least one processor produces at least one commanding signal to initiate motion of a filament breaking mesh 330. Upon receipt of at least one commanding signal, at least one drive mechanism moves the filament breaking mesh 340. Then, the filament breaking mesh breaks any filaments present within the battery 350. The method 300 then ends 360.

Figure 4:
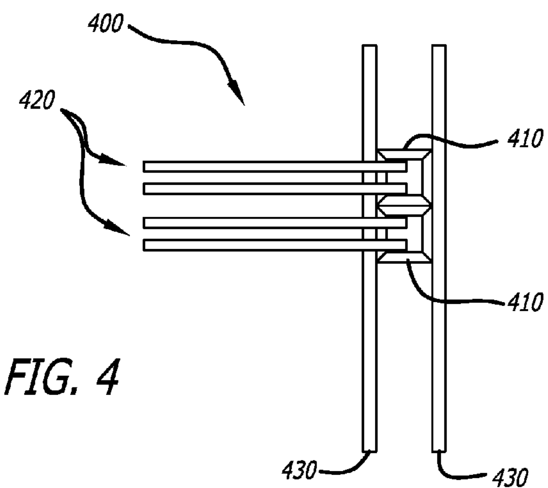
FIG. 4 shows a close-up view of a portion of the filament breaking mesh of FIGS. 1 and 2, in accordance with at least one embodiment of the present disclosure.

FIG. 4 shows a close-up view of a portion 400 of the filament breaking mesh 110 of FIGS. 1 and 2, in accordance with at least one embodiment of the present disclosure. In this figure, the portion 400 shown of the filament breaking mesh 110 is a portion of one side 520 (refer to FIG. 5) of the filament breaking mesh 110. This portion 400 of the filament breaking mesh 110 is shown to contain side tabs 410 that are housed within raceway capture walls 430. Shown to be attached to the side tabs 410 are mesh fibers 420, which constitute the mesh of the filament breaking mesh 110. The filament breaking mesh 110 is manufactured from at least one polymeric material.

The filament breaking mesh 110 may be manufactured from a polymer or a copolymer. Types of polymer materials that may be used for the filament breaking mesh 110 include, but are not limited to, polyacrylonitrile and polyamide. Types of copolymer materials that may be utilized for the filament breaking mesh 110 include, but are not limited to polyamide-imide and fluorinated ethylene polyplene. Polymer combinations containing two or more polymers are also applicable. Key material properties are that the filament breaking mesh 110 materials must be non-conductive (e.g., less than 0.01% of the conductance of a lithium filament of the minimum diameter causing shorting) and must be suitable unreactive with the battery materials, particularly the electrolyte and metallic lithium.

The diameter of each of the mesh fibers 420 of the filament breaking mesh 110 is manufactured to be approximately four times the expected largest diameter of any of the metal filaments within the battery. Preferably, the polymeric materials may be manufactured to have a mesh grid size of 5 millimeters (mm) or less in order to break filaments of a size of 0.05 mm or more.

Figure 5:
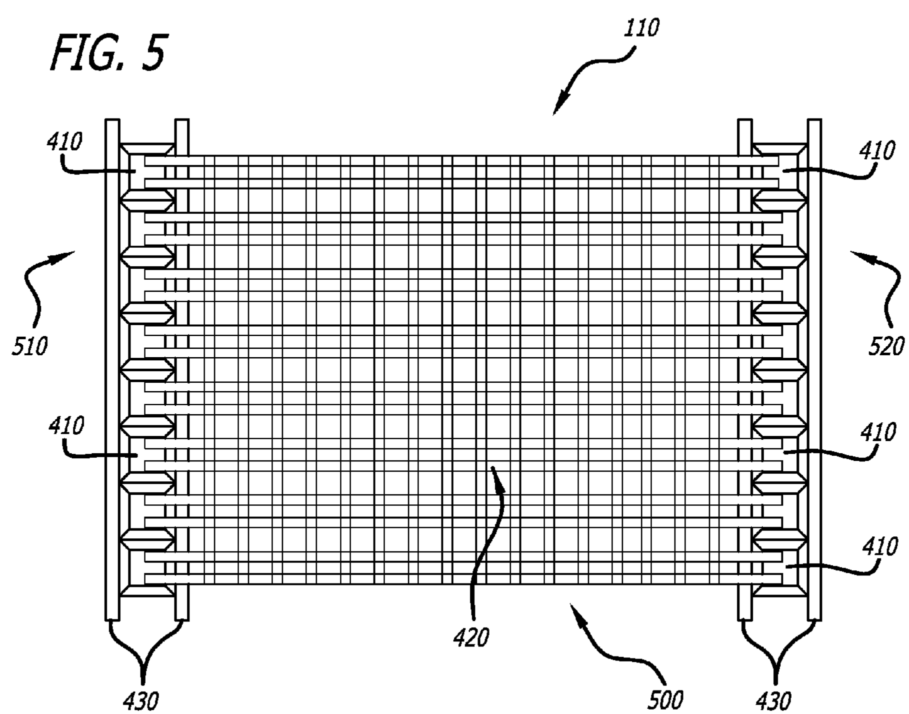
FIG. 5 illustrates a front view of the filament breaking mesh of FIGS. 1 and 2, in accordance with at least one embodiment of the present disclosure.

FIG. 5 illustrates a front view 500 of the filament breaking mesh 110 of FIGS. 1 and 2, in accordance with at least one embodiment of the present disclosure. In this figure, both sides 510, 520 of the filament breaking mesh 110 are shown to comprise side tabs 410 housed within raceway capture walls 430. The mesh fibers 420 are shown to extend between the two sides 510, 520 of the filament breaking mesh 110.

Figure 6:
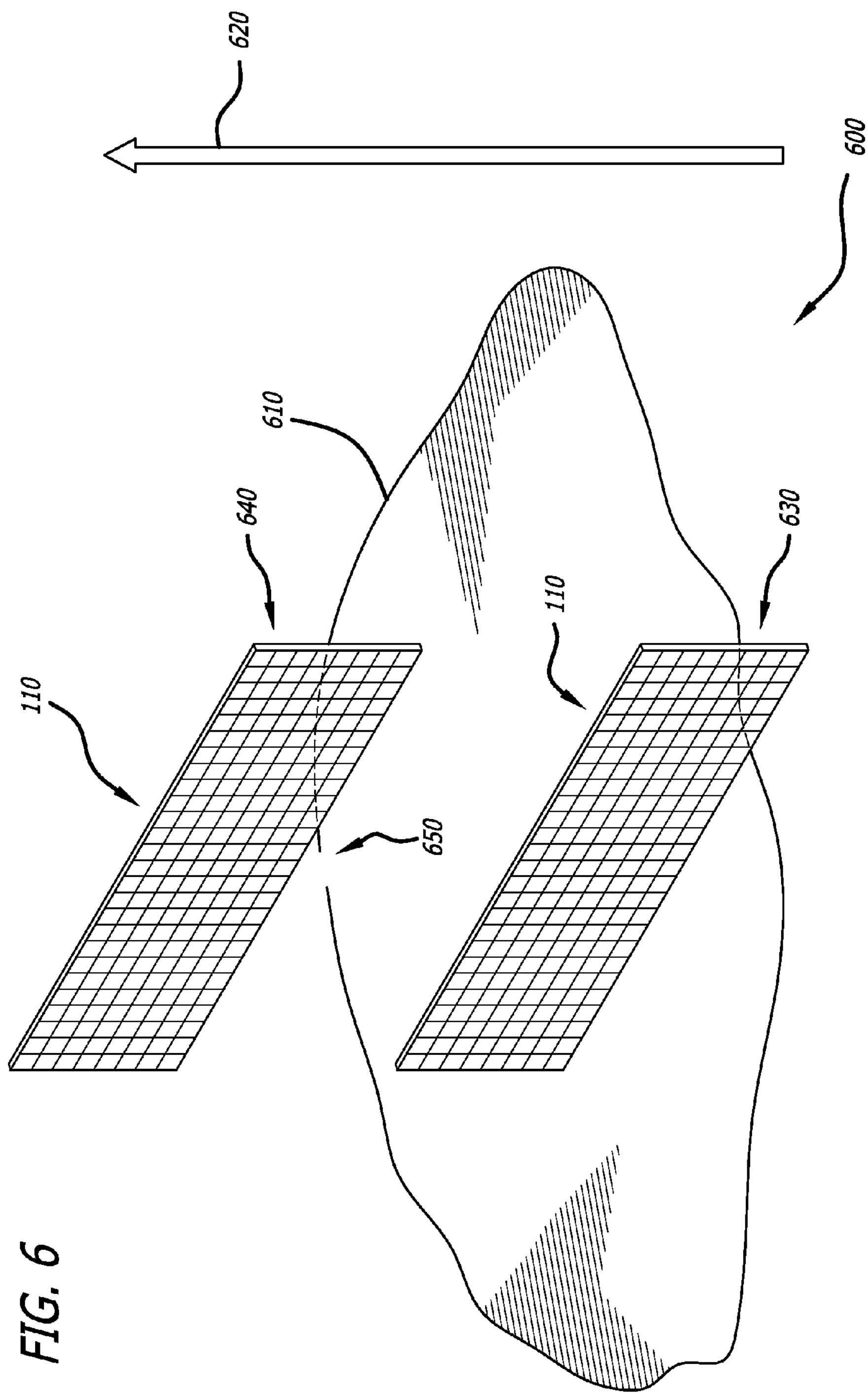
FIG. 6 is a diagram showing the breaking of a metal filament upon movement of the filament breaking mesh of FIGS. 1 and 2, in accordance with at least one embodiment of the present disclosure.

FIG. 6 is a diagram 600 showing the breaking of a metal filament 610 upon movement of the filament breaking mesh 110 of FIGS. 1 and 2, in accordance with at least one embodiment of the present disclosure. In this figure, the filament breaking mesh 110 is shown to be moving in the direction of arrow 620, which is denoting an upward direction. When the filament breaking mesh 110 is in its initial position 630, a metal filament 610 is shown to be intact and passing through the filament breaking mesh 110, thereby causing an internal shorting condition. When the filament breaking mesh 110 has moved to its deployed position 640, the metal filament 610 is shown to have been broken 650 by the filament breaking mesh 110 and, thus, the internal shorting condition is no longer present.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for mitigating internal shorting in a battery, the method comprising:

sensing, with at least one sensor, an internal shorting condition of the battery;

producing, by at least one processor, at least one commanding signal to initiate motion of a filament breaking mesh;

moving, by at least one drive mechanism, the filament breaking mesh, upon receiving the at least one commanding signal; and breaking, with the filament breaking mesh, at least one filament present within the battery.

2. The method of claim 1, wherein the sensing of the at least one sensor comprises at least one of sensing temperature, sensing voltage, sensing impedance, and sensing pressure.

3. The method of claim 1, wherein the battery is a lithium-ion battery.

4. The method of claim 1, wherein the at least one drive mechanism is a shuttle driver attached to the filament breaking mesh.

5. The method of claim 1, wherein the filament breaking mesh is manufactured from at least one polymeric material.

6. The method of claim 5, wherein at least one of the at least one polymeric material is a polymer.

7. The method of claim 6, wherein the polymer is one of a polyacrylonitrile and a polyamide.

8. The method of claim 5, wherein at least one of the at least one polymeric material is a copolymer.

9. The method of claim 8, wherein the copolymer is one of a polyamide-imide and a fluorinated ethylene propylene.

10. The method of claim 1, wherein a diameter of mesh fibers of the filament breaking mesh are manufactured to be approximately four times an expected largest diameter of any of the filaments within the battery.

11. The method of claim 1, wherein a grid size of the filament breaking mesh is 5 millimeters (mm) or less.

12. The method of claim 1, wherein the filament breaking mesh is manufactured from a material that is non-conductive and unreactive with materials of the battery.

13. The method of claim 1, wherein the breaking with the filament breaking mesh comprises at least one of breaking the at least one filament and pulling the at least one filament off at least one electrode of the battery.

14. A system for mitigating internal shorting in a battery, the system comprising:

at least one sensor to sense an internal shorting condition of the battery;

a filament breaking mesh within the battery to break at least one filament present within the battery;

at least one processor to produce at least one commanding signal to initiate motion of the filament breaking mesh, when an internal shorting condition is sensed by the at least one sensor; and at least one drive mechanism to move the filament breaking mesh, upon receipt of the at least one commanding signal, to break the at least one filament present within the battery.

15. The system of claim 14, wherein the at least one sensor is at least one of a temperature sensor, a voltage sensor, an impedance sensor, and a pressure sensor.

16. The system of claim 14, wherein the battery is a lithium-ion battery.

17. The system of claim 14, wherein the at least one drive mechanism is a shuttle driver attached to the filament breaking mesh.

18. The system of claim 14, wherein the filament breaking mesh is manufactured from at least one polymeric material.

19. The system of claim 14, wherein a diameter of mesh fibers of the filament breaking mesh are manufactured to be approximately four times an expected largest diameter of any of the filaments within the battery.

20. The system of claim 14, wherein the filament breaking mesh is to break the at least one filament within the battery by at least one of breaking the at least one filament and pulling the at least one filament off at least one electrode of the battery.

21. The system of claim 14, wherein the battery comprises a positive electrode and a negative electrode that are separated by a separator.

22. The system of claim 21, wherein the separator is manufactured from at least one material to provide ionic conduction for current flow between the positive electrode and the negative electrode.

23. The system of claim 21, wherein the filament breaking mesh lies adjacent and parallel to the separator within the battery.

24. An apparatus for mitigating internal shorting in a battery, the apparatus comprising:

a filament breaking mesh within the battery to break at least one filament present within the battery; and at least one drive mechanism to move the filament breaking mesh, when an internal shorting condition of the battery occurs, to break the at least one filament present within the battery.

25. The apparatus of claim 24, wherein the at least one drive mechanism is a shuttle driver attached to the filament breaking mesh.

* * * * *